US008617354B2

(12) United States Patent
Stigsson

(10) Patent No.: US 8,617,354 B2
(45) Date of Patent: Dec. 31, 2013

(54) SHAPED CELLULOSE MANUFACTURING PROCESS COMBINED WITH A PULP MILL RECOVERY SYSTEM

(75) Inventor: Lars Stigsson, Bjärred (SE)

(73) Assignee: Kiram AB, Bjarred (SE)

( * ) Notice: Subject to any disclaimer, the term of this patent is extended or adjusted under 35 U.S.C. 154(b) by 0 days.

(21) Appl. No.: 13/255,777

(22) PCT Filed: Mar. 8, 2010

(86) PCT No.: PCT/SE2010/050256
§ 371 (c)(1),
(2), (4) Date: Sep. 23, 2011

(87) PCT Pub. No.: WO2010/104458
PCT Pub. Date: Sep. 16, 2010

(65) Prior Publication Data
US 2012/0000621 A1    Jan. 5, 2012

Related U.S. Application Data

(60) Provisional application No. 61/202,517, filed on Mar. 9, 2009, provisional application No. 61/272,080, filed on Aug. 14, 2009.

(30) Foreign Application Priority Data

Sep. 11, 2009  (SE) ........................... 0901175
Dec. 28, 2009  (SE) ........................... 0901615

(51) Int. Cl.
*D21C 11/00* (2006.01)
*C08B 16/00* (2006.01)
*D01F 2/02* (2006.01)

(52) U.S. Cl.
USPC ... 162/16; 162/9; 162/19; 162/29; 162/30.11; 162/32; 162/42; 162/52; 162/60; 162/63; 162/65; 162/80; 264/188; 264/203; 264/211.11; 526/56; 526/60; 526/128

(58) Field of Classification Search
USPC ........... 162/9, 14, 16, 19, 29, 30.1–30.11, 32, 162/41–42, 52, 60, 63, 65, 70, 80; 264/187–188, 203, 211.1, 211.11; 536/56–62, 127–128; 106/123.11
See application file for complete search history.

(56) References Cited

U.S. PATENT DOCUMENTS

| 2,541,058 | A | * | 2/1951 | Heritage et al. ............. 530/500 |
| 2,731,345 | A | * | 1/1956 | I-Tsai ............................. 162/84 |
| 2,882,965 | A | * | 4/1959 | Wayman et al. ................ 162/89 |
| 3,294,623 | A | | 12/1966 | Brinkley et al. |
| 3,428,520 | A | * | 2/1969 | Yiannos .......................... 162/38 |
| 3,532,597 | A | * | 10/1970 | Ljungqvist ....................... 162/84 |
| 4,199,399 | A | | 4/1980 | Villavicencio |
| 4,352,770 | A | | 10/1982 | Turbak et al. |
| 4,681,935 | A | * | 7/1987 | Forss et al. ....................... 536/56 |
| 5,929,228 | A | | 7/1999 | Cheng |
| 6,057,438 | A | | 5/2000 | Hyatt et al. |
| 6,512,110 | B1 | * | 1/2003 | Heikkila et al. .............. 536/127 |
| 6,533,896 | B1 | * | 3/2003 | Tikka et al. ..................... 162/19 |
| 6,706,237 | B2 | * | 3/2004 | Luo et al. ........................ 264/555 |
| 6,770,168 | B1 | * | 8/2004 | Stigsson ......................... 162/24 |
| 6,833,187 | B2 | * | 12/2004 | Luo et al. ...................... 428/359 |
| 7,083,704 | B2 | * | 8/2006 | Sealey et al. .................... 162/90 |
| 7,097,737 | B2 | * | 8/2006 | Luo et al. ........................ 162/72 |
| 7,959,765 | B2 | * | 6/2011 | Argyropoulos ................ 201/2.5 |
| 8,252,141 | B2 | * | 8/2012 | Stigsson et al. ................ 162/29 |
| 2004/0055716 | A1 | * | 3/2004 | Landalv et al. .............. 162/30.1 |
| 2004/0194900 | A1 | * | 10/2004 | Delin ............................... 162/29 |
| 2004/0206463 | A1 | * | 10/2004 | Luo et al. ........................ 162/21 |
| 2004/0207110 | A1 | * | 10/2004 | Luo et al. ...................... 264/187 |
| 2004/0209078 | A1 | * | 10/2004 | Luo et al. ...................... 428/375 |
| 2005/0076568 | A1 | * | 4/2005 | Stigsson ................... 48/197 FM |
| 2006/0070710 | A1 | * | 4/2006 | Hernesniemi et al. .......... 162/29 |
| 2006/0169430 | A1 | * | 8/2006 | Tarasenko ....................... 162/81 |
| 2008/0219912 | A1 | * | 9/2008 | Olsen et al. ................... 423/430 |
| 2008/0289782 | A1 | * | 11/2008 | Saviharju et al. ............ 162/30.1 |
| 2009/0025892 | A1 | * | 1/2009 | Tanner ........................... 162/29 |
| 2009/0304921 | A1 | * | 12/2009 | Olsen et al. ................... 427/215 |
| 2010/0189614 | A1 | * | 7/2010 | Olsen et al. ................... 423/210 |
| 2011/0192560 | A1 | * | 8/2011 | Heikkila et al. ................ 162/29 |
| 2011/0250638 | A1 | * | 10/2011 | Sjoede et al. ................. 435/68.1 |
| 2012/0000621 | A1 | * | 1/2012 | Stigsson ....................... 162/158 |

FOREIGN PATENT DOCUMENTS

| CA | 2 651 025 A1 | 11/2007 | |
| WO | WO 9412719 A1 * | 6/1994 | .............. D21C 1/02 |
| WO | 2007/128026 A1 | 11/2007 | |
| WO | WO 2010104458 A1 * | 9/2010 | |

OTHER PUBLICATIONS

English Translation of WO 94/12719, published on Jun. 9, 1994.*

(Continued)

*Primary Examiner* — Jose Fortuna
(74) *Attorney, Agent, or Firm* — Nath, Goldberg & Meyer; Joshua B. Goldberg; Megan B. Doughty

(57) ABSTRACT

Provided is a process for manufacturing shaped cellulose materials from lignocellulose where a dissolving grade pulp is manufactured and dissolved in an aqueous alkaline or acidic solvent system forming a solution suitable for shaping new cellulose structures including fibers, films and cellulose derivatives. At least a part of the spent cellulose dissolving or cellulose shaping chemicals are recovered in one or more unit operations in a pulp mill chemical recovery cycle.

32 Claims, No Drawings

(56) References Cited

OTHER PUBLICATIONS

Ribas Batalha et al., "Dissolving Pulp Production From Bamboo," BioResources 2012, 7(1), pp. 640-651.*

Christov et al. "The potential of bisulfite pulping in dissolving pulp production," Enzyme and Microbila Technology, 1998, vol. 23, pp. 70-74.*

Office Action in the Chinese counterpart Application No. 201080010731.4, one (1) page.

* cited by examiner

SHAPED CELLULOSE MANUFACTURING PROCESS COMBINED WITH A PULP MILL RECOVERY SYSTEM

This is a National Phase Application filed under 35 U.S.C. 371 as a national stage of PCT/SE2010/050256, filed 8 Mar. 2010, and claiming the benefit from Swedish Application No. 0901175-0, filed Sep. 11, 2009, and claiming the benefit from Swedish Application No. 0901615-5, filed Dec. 28, 2009, and claiming the benefit under 35 U.S.C. 119(e) from U.S. Provisional Application No. 61/202,517, filed on Mar. 9, 2009, and claiming the benefit under 35 U.S.C. 119(e) from U.S. Provisional Application No. 61/272,080, filed on Aug. 14, 2009, the content of which is hereby incorporated by reference in its entirety.

FIELD OF THE INVENTION

The present invention relates to a process for the manufacturing of shaped cellulose materials from lignocellulose. A dissolving grade pulp rich in alfa cellulose is manufactured and dissolved in an aqueous alkaline or acidic solvent system forming a solution suitable for shaping new cellulose structures including fibers, films and cellulose derivatives. More particularly the present invention is directed to a process for combining the production of shaped cellulosic material in a kraft, sulfite or soda pulp mill wherein at least a part of the spent cellulose dissolving or cellulose shaping chemicals are recovered in one or more unit operations in the pulp mill chemical recovery cycle.

BACKGROUND TO THE INVENTION

Current industrial processes for pulping wood and other sources of lignocellulosic material such as annual plants, and processes for bleaching the resultant pulp have evolved slowly over many decades. To remain competitive, the mature pulp and paper industry is seeking new markets for the products produced in pulp mills. It is of particular interest to further refine cellulose and to valorize hemicelluloses and lignin.

Dissolving pulp is a low yield (30-40% by weight on wood) bleached chemical wood pulp that has high alfa cellulose content (>90%). This pulp has special properties, such as a high level of brightness and high purity. Dissolving pulp is used for production of regenerated cellulose products. The dominant process for manufacturing regenerated cellulose fibers, the viscose process, is suffering from a high environmental burden and high energy demand. The viscose process is using large quantities of carbon disulfide a chemical often contaminated with foul-smelling impurities, such as carbonyl sulfide, hydrogen sulfide and organic sulfides. Even the best of current technology is unable to suppress the odors emitted in viscose plants. Furthermore there is no efficient chemicals recovery process for recovery of spent dissolving and coagulation chemicals.

The NMMO (N-Methylmorpholine oxide) process, a rather new non-derivatizing process for producing regenerated cellulose fibers is emerging as an alternative to the viscose process, however, recovery of the NMMO solvent is complicated, energy demanding and costly. The Chinese patent application CN 101280476 is directed to a new method for recycling of NMMO solvent using cationic and anionic resins.

The European patent application EP 1900860 is directed to a process for dissolving cellulose in a sodium hydroxide urea mixture. While this process may have an advantage in comparison to the viscose and NMMO processes there is no suggestion on how to recover the dissolving/coagulation chemicals.

Dissolving types of pulps, whether they are produced by a prehydrolysis kraft process or sulfite process, are traditionally used for manufacturing of viscose or cellulose derivatives such as cellulose esters, rayon fibers and cellophane. Rayon is a soft textile material, used in mostly tops, coats and jackets. Viscose material can be produced either from dissolving grade pulp or from cotton linter fibers. The manufacturing process starts by treating the fibers with sodium hydroxide (mercerization). The mercerized pulp is thereafter mixed with carbon disulfide to form cellulose xanthate, a cellulose ester. The cellulose xanthogenate is dissolved in sodium hydroxide forming a viscous cellulose solution. The cellulose solution or viscose is extruded into an acidic bath either through a slit to make cellophane, or through a spinneret to make rayon. In the acidic environment the xanthogenate ester is decomposed into cellulose and sulphurous compounds. A portion of the carbon disulfide is recovered and recycled to treat new cellulose.

European Patent EP1521873 is directed toward a process for the manufacture of solid regenerated viscose fiber describing certain new features of the traditional viscose process.

The viscose process was developed well over hundred years ago and the process still has a dominant position on the market for production of regenerated cellulose. For more details on the viscose process (and NMMO process) reference is made to "Regenerated Cellulose Fibres" The Textile Institute, Ed. Calvin Woodings, Cambridge 2001. (ISBN 1 85573459 1)

Dissolving pulp can be manufactured by alkaline (kraft, soda) and acidic (sulfite, bisulfite) pulping processes. In the kraft process the cooking liquor is made up of sodium hydroxide and sodium sulfide, in a nonsulfur soda pulp mill the sodium sulfide is, in some locations, at least partly, replaced with anthraquinone. Sulfite mills uses sodium sulfite or magnesium sulfite/bisulfite as the active cooking chemicals. The chemicals recovery cycle in a pulp mill include a recovery boiler, evaporation plant, sulfur dioxide recovery units (for sulfite mills) and recausticising plant (alkaline pulp mills). For a detailed description of kraft, soda and sulfite chemical pulping reference is made to "Chemical Pulping" Book 6A, Ed. Johan Gullichsen, 2000. (ISBN 952-5216-06-3) and "Pulp and Paper Manufacture" Volume 4. Sulfite Science & Technology" Ed. by O. V. Ingruber, 1985. (ISBN 1-919893-22-8).

When the objective of the cellulose pulping operations is to produce a dissolving type of pulp the target physical quality parameters for the product are different than target quality parameters for paper pulp. Tear and tensile strength is no longer important while cellulose pulp purity is of essence (low lignin content, low metals and ash content.

It is apparent that there is a need for a new and more efficient cellulose dissolving process to replace the traditional viscose process.

SUMMARY OF THE INVENTION

The present invention is directed to a process for combining the production of cellulosic fiber products in a kraft, sulfite or soda AQ pulp mill with a process for dissolving cellulose using a new solvent system wherein at least a part of the spent cellulose solvent chemicals are recovered in one or more unit operations in the pulp mill chemical recovery cycle.

One objective of the present invention is to establish an efficient cellulose dissolving process for making shaped cellulosic material integrated into a cellulose pulp mill.

Another objective of the present invention is to provide a low capital intensity and environmentally superior process for the manufacturing of a cellulose dope suitable for shaping into new cellulose fibers, films or cellulose derivatives.

The objectives of the present invention are accomplished by using alkaline or acidic cellulose solvents for dissolving cellulose said solvents optionally comprising an amphiphilic additive with a capacity for breaking up the crystallinity of cellulose. At least part of the solvent chemicals used for cellulose dissolving or cellulose shaping are recovered in the same process equipment, together with recovery of delignification chemicals, oxygen delignification chemicals or pulp bleaching chemicals. Recovered cellulose solvent and chemicals are recycled from chemicals recovery to dissolve cellulose or shape cellulose to new fibers, films or cellulose derivatives.

DETAILED DESCRIPTION OF THE INVENTION

The process of the present invention thus relates to a dissolving cellulose pulp manufacturing and cellulose dissolving process with an integrated recovery system for recovery of pulping chemicals and recovery of chemicals for dissolving or shaping cellulose. The subject process is carried out on in several steps wherein the first step involves physical and chemical treatment of lignocellulosic material such as wood or annual plant material in order to increase accessibility of the lignocellulosic material.

Following the chemical and physical pretreatment the material is cooked in an alkaline or acidic buffer solution optionally in the presence of one or more active chemical reagents in order to obtain a delignified brown stock cellulosic pulp. The brown stock pulp is optionally further delignified by oxygen. Cellulose rich pulp is thereafter bleached using environmentally friendly chemicals such as ozone, chlorine dioxide and hydrogen peroxide in order to obtain a final dissolving pulp product with low lignin content and desirable physical properties. The spent cellulose liquor generated in the process comprising lignin components and spent chemical reagents is concentrated by evaporation followed by full or partial oxidation in a gas generator. In the gas generator a stream of hot raw gas and a stream of alkaline chemicals and chemical reagents are formed. The alkaline chemicals are discharged from the gas generator and further treated for subsequent recycle and reuse in the pulp manufacturing process. Alternatively or combined with partial or full oxidation the spent liquor is treated with an acid for recovery of lignin.

The dissolving pulp produced by the above referenced procedure is dissolved in a solvent to form a substantially homogeneous cellulose rich solution or gel. The pulp dissolving step is advantageously performed directly adjacent to a dissolving pulp plant.

In the following section the invention is described in more detail starting with the feed material preparation.

i) Feed Material Preparation and Hexose Hemicelluloses Removal

Both hardwoods such as eucalyptus, acacia, beech, birch and mixed tropical hardwood and softwoods such as pine, spruce and hemlock can be used for manufacturing of a dissolving pulp suitable for dissolving in the cellulose solvent system of the present invention.

Hemicelluloses have, at least partly, to be removed from a dissolving grade pulp. Hemicelluloses removal can be performed by an acidic or alkaline prehydrolysis extraction procedure prior to cooking or, in the case of pentoses such as xylane, by extraction from the pulp product after cooking. Depending on the application, the hemicelluloses content in the final dissolving pulp product should be below about 7% by weight and preferably below about 3% by weight.

In order to remove hemicelluloses from the lignicellulosic feed material the cooking step may be preceded by a chips prehydrolysis step. Such a treatment would, in addition to removal of hemicelluloses, increase the accessibility of cooking chemicals to the interior of the wood structure and decrease the effective alkali requirement in subsequent pulping operations. In particular a prehydrolysis stage will be applied when the feedstock to the process of the present invention contains a substantial amount of hexoses such as glucomannans.

A variant of prehydrolysis in this context is autohydrolysis which essentially is a steam hydrolysis of the lignocellulosic material at temperatures of 175-225° C.

Under autohydrolysis conditions, the hemicellulose components, as in prehydrolysis, are solubilized and the lignin is partially hydrolyzed by cleavage of phenolic and ether linkages.

In yet another variant of prehydrolysis, steam explosion hydrolysis, the wood material is treated with steam at a temperature of 200-250° C. for a couple of minutes. This treatment is followed by an explosively rapid discharge to disintegrate the cellulosic substrate. In this type of process, however, both chemical and mechanical attacks on the cellulosic material leads to extensive depolymerization of the carbohydrates.

The spent liquor resulting from the prehydrolysis treatment should preferably be removed from the cellulosic material before the pulp is subjected to further treatment. The spent liquor can be removed through extraction strainers by washing or by pressing the cellulosic material. After optional recycling the spent liquor is discharged from the pretreatment step.

The pH during a prehydrolysis step can, depending on the desired degree of hemicelluloses removal, be adjusted (by temperature, time and additives) to any suitable value in the range between about 0.5 to 7.0 preferably to a level between 1.0 and 5.0 and in the case of autohydrolysis a pH in the range of 4 to 6.

ii) Cooking/Delignification

After the cellulosic material has been subjected to any pretreatment such as chipping, steaming or prehydrolysis; the material is cooked in the presence of alkaline or acidic cooking liquor based on a soluble alkali metal or alkali earth metal compound. The base alkali metal is sodium and the base alkaline earth metal is magnesium or calcium.

The objective of the cooking step is to separate cellulose and lignin by dissolving the lignin in the cooking liquor. In case of a kraft or soda process, alkaline cooking liquor consists primarily of an alkali metal hydroxide or carbonate (and sodium hydrosulfide in kraft). Acidic cooking liquor could be any sulfite cooking liquor with a capacity to sulfonate and dissolve lignin. In alkaline pulping processes alkali metal phosphates and alkali metal boron compounds can be used as cooking liquor alkali.

The alkaline cooking liquor originate in the chemicals recovery system of the pulping plant from where it is recycled, with or without partial causticizing, to the cooking stage. When boron based alkali is present in the in the cooking liquor the causticising and lime reburning demand is lowered as boron chemicals are partly autocausticised in the recovery boiler.

In a sodium sulfite or sodium bisulfite pulp mill the sulfur needs to be separated from the sodium base in order to regenerate the cooking acid. Sodium sulfate, sulfite and lignosulfonates present in the sulfite process spent liquor (red liquor) are forming a smelt comprising sodium sulfide in the recovery boiler. The smelt is dissolved and sodium and sulfur compounds are separated to form fresh cooking acid. In magnesium based pulp mills the magnesium and sulfur are separated in the recovery boiler. Solid magnesium oxide particles are removed and dissolved forming a magnesium hydroxide solution. Gaseous sulfur oxides are scrubbed with magnesium hydroxide forming fresh magnefite cooking liquor.

Regardless of pulping process the temperature in the cooking stage is maintained within the range from about 110° C. to about 200° C. preferably from about 120 to 160° C. At the higher cooking temperatures, a shorter retention time in the reaction vessel is required. A retention time of 30 to about 60 minutes can suffice at a temperature in the range of 170 to 200° C., while from 60 to 360 minutes may be necessary to obtain the desired result at cooking temperatures lower than about 170° C.

Traditional types of single or dual vessel continuous digesters of the hydraulic or steam liquor phase type as well as batch digesters where the wood material is retained in the reaction vessel throughout the cooking procedure may be employed to contain the cooking reactions.

The recovery of spent liquors from these steps can be integrated in a known manner with the recovery of spent liquors from an oxygen delignificaton stage. The spent liquors can be concentrated by evaporation and combusted in a separate combustor or gasifier or mixed with other spent liquors for further treatment.

Delignification catalysts and other additives can be added to the cooking stage of the present process. Some of these additives are commonly used to increase the rate of delignification during alkaline digestion of cellulosic materials.

Sulfur chemicals free pulping is of particular interest both for environmental reasons but also for the possibility of sulfur free lignin recovery. In a sulfur free alkaline pulping process specific polyaromatic organic compounds can be added to be present in the cooking stage, such compounds including anthraquinone and its derivatives such as 1-methylanthraquinone, 2-methylanthraquinone, 2-ethylanthraquinone, 2-methoxyanthraquinone, 2,3-dimethylanthraquinone and 2,7-dimethylanthraquinone. Other additives with a potential beneficial function in this stage include carbohydrate protectors and radical scavengers. Such compounds include various amines such as triethanolamine and ethylenediamine and alcohols such as methanol, ethanol, n-propanol, isobutyl alcohol, neopentyl alcohol and resorcinol and pyrogallol.

Anthraquinone and its derivatives constitute the preferred organic additives for use in the cooking stage in a sulfur free pulping configuration. The anthraquinone additives are preferably used in quantities not exceeding 1% of the weight of the dry cellulosic substances and more preferably below about 0.5%.

The optimum operating conditions and chemical charges in the cooking stage of the process depend on several parameters including the source and origin of the cellulosic raw material, the end use of the product etc. These specific conditions can be readily determined by the artisan for each individual case.

iii) Oxygen Delignification

After cooking/delignification the cellulosic material is optionally subjected to a mechanical defibration treatment in order to liberate the fibers, facilitating efficient contact between the reactants in a following oxygen delignification stage. Defibration can be achieved, in its broadest sense, by introducing a fibrous accumulated material into a treatment apparatus in which the fibers are, at least partially, loosened from each other by breaking the chemical bonds between individual fibers and by leaving the bonds affected by physical forces essentially undisturbed. Further defibration of the treated fiber accumulations may be performed by subjecting the material to shear forces of sufficient strength to substantially and completely separate said fibers without cleaving or dividing the solid, chemically bonded particles within the fiber accumulations.

Oxygen delignification and bleaching with oxygen-based molecules have become standard in conjunction with the manufacturing of bleached kraft and sulfite pulp and the cost of oxygen chemicals has come down significantly.

In analogy with an alkaline cooking step alkaline liquor is also present during oxygen delignification. The alkaline liquor comprises alkali metal hydroxide and carbonate. Other buffering chemicals can be employed such as alkali metal phosphates and alkali metal boron compounds. The alkaline liquor used in the oxygen delignification stage in a kraft mill originates in the chemicals recovery system more particularly from a causticising unit where the alkalinity of the liquor is restored to a pH value above about 13 (white liquor). In order to eliminate reduced sulfur compounds in the alkaline liquor solution (white liquor), the liquor can advantageously be oxidized (white liquor oxidation) using air, oxygen and or/ozone.

The oxygen added to the oxygen delignification stage can either be pure oxygen or an oxygen containing gas, the selection based on oxygen cost and partial pressure needed in the reactor. The total pressure in the reactor is made up of the partial pressure of steam, oxygen and other gases injected or evolved as a result of the reactions in the oxygen delignification process. The partial pressure of oxygen should be kept in the range of from 0.1 to 2.5 MPa.

The key objective of the cooking step ii) and oxygen delignification step iii) is to liberate and dissolve lignin from the lignocellulosic material. If the cooking step ii) is operated at harsh conditions and lignin content in the cellulosic material is lower than about 2% after cooking, the oxygen delignification stage may be omitted. The drawback of a configuration without oxygen delignification is that the following step iv) will have to be optimized also for lignin removal.

iv) Bleaching and Xylane Recovery

The cellulose pulp produced in accordance with the procedures described herein is finally treated to obtain a high quality dissolving pulp by alkali extraction and/or bleaching using effective bleaching agents, such as chlorine dioxide, hypochlorite, peroxide and/or oxygen, ozone, cyanamide, peroxyacids, nitrogen oxides or combinations of any such bleaching agents, in one or more steps.

Apart from bleaching to high brightness (over 88 ISO) the pulp the lignin content is also lowered during pulp bleaching operations. The lignin content of the cellulose pulp after bleaching should be lower than about 2% preferably lower than about 0.5% by weight.

Apart from makeup alkali charged counter currently with the pulp flow, a portion or all the alkali used in bleaching and extraction stages is recycled from a pulp mill recausticising plant. Any reduced sulfur in recycled alkali is removed by oxidation.

The alkaline bleach plant filtrates are preferably recycled counter currently back to an oxygen delignification stage. Acidic bleach plant filtrates, specifically those originating from chlorine dioxide, ozone, nitrogen oxide or other acidic treatment stages, can be recycled directly or indirectly to a prehydroloysis feed pretreatment stage.

When the feed material to the pulping process is a pentose rich hardwood and partial removal of pentoses from the pulp product is desired, pentoses such as xylanes can advantageously be removed from the cellulose pulp in any position after the cooking/delignification step prior to cellulose dissolving. The extraction is performed by an aqueous extractant preferably an aqueous alkaline metal hydroxide (cold extraction or hot extraction) at conditions chosen for selectively dissolving xylanes. Dissolved xylane is precipitated from the extractant by acidulation with an acid such as carbon dioxide or by dilution of the extractant with water or an organic solvent such as a monohydric C1-C4 alcohol such as ethanol or iso-propanol. Precipitated xylane is removed and the extractant is recycled, and recausticised if needed, to treat new pulp.

Recovered pentoses (exemplified hereinabove with xylane) can be exported from the pulp mill or upgraded on site to green chemicals and polymers such as furfural, lactic acid, PLA etc. Alternatively, recovered pentoses can be transformed on site into furfural using an acidic process comprising an acidulation followed by fractionation/distillation or transformed directly to furfural in a catalytic distillation unit.

v) Chemicals and Energy Recovery

Spent pulping liquor is, with or without prior extraction of lignin and other organic material, withdrawn to be further processed in a recovery process to recover alkali or alkali earth metal compounds and energy values.

The spent cooking liquor contains almost all of the inorganic cooking chemicals along with lignin and other organic matter separated from the lignocellulosic material. The initial concentration of weak spent liquor discharged from the digester is about 15% dry solids in an aqueous solution. Weak spent liquor is concentrated to firing conditions in evaporators and concentrators to a solids content ranging from about 65% to about 85%.

While a standard recovery boiler may be used for processing spent pulping liquor, a chemicals recovery system based on gasification or partial oxidation of the cellulose spent liquors in a gas generator can also be used.

Gasification of carbonaceous material for the recovery of energy and chemicals is a well established technology and emerging as an alternative for recovery of chemicals and energy in pulp mills. Cellulose spent cooking liquors contains a large fraction of salty inorganic compounds with a low melting and agglomeration point and although various fluidized bed concepts have been disclosed for conversion of cellulose spent liquors, it is generally agreed that a suspension or entrained flow gasifier is more suitable for gasifiying spent cooking liquors.

Several types of gasifiers or gas generators can be used, with minor modifications, in the practice of the present invention including, for example, the gasifiers described in U.S. Pat. No. 4,917,763, U.S. Pat. No. 4,808,264 and U.S. Pat. No. 4,692,209. These gasification systems are suitable for chemicals and energy recovery from high sulfidity cellulose spent kraft and sodium base sulfite cooking liquors. The sulfur chemicals are recovered as alkali sulfides but a substantial portion of the sulfur will also follow the raw fuel gas as hydrogen sulfide and carbonyl sulfide. Entrained molten alkaline chemicals in the raw fuel gas are separated from the gas stream in a cooling and quenching stage and dissolved in an aqueous solution. The alkaline solution, called green liquor, is causticized with lime to obtain a high alkalinity white liquor, the traditional cooking chemical used in kraft pulping operations.

On the other hand two stage reaction zone up draft gasifiers designed for gasification of heavy hydrocarbons and coal can also, with minor modifications, be used in the practice of the present invention, such gasifiers described in e.g. U.S. Pat. No. 4,872,886 and U.S. Pat. No. 4,060,397.

Another gasifier with a suitable design for use in the present invention is disclosed in U.S. Pat. No. 4,969,931.

Regardless of the type and design of gasifier or recovery boiler, inorganic molten droplets and aerosols formed in the unit is separated from the gas flow and dissolved in an aqueous solution. The solution comprises alkaline compounds in a form suitable, optionally via causticizing, for use as alkali in oxygen delignification, alkaline cooking stages and cellulose dissolving/cellulose shaping stages of the present invention. Causticizing is a well known unit operation in the art of alkaline chemical pulping and is not described herein.

Are sulfur compounds present in the spent cooking liquor these compounds will form alkali sulfides and alkali sulfate depending on the design of the recovery unit. Alkali sulfide as such is an effective pulping chemical/catalyst in the kraft process. In sodium base sulfite mills the sodium and sulfur needs to be separated to restore fresh cooking acid. Chemicals recovery design and operation for kraft and sulfite mills is well known to the artisan.

In addition to the chemicals recovered for pulping and bleaching operations the recovery system of the pulp mill is also used for recovery and restoration of cellulose dissolving, cellulose coagulation and shaped cellulose washing liquids. These aqueous liquids comprise alkali metal value and need to be restored into active dissolving chemicals. Restoration of alkali metal hydroxide for use in a cellulose dissolving stage may comprise one or more of concentration in an evaporation plant, partial or full oxidation combined with spent pulping liquor in a recovery boiler or gas generator, causticizing in a recausticsing plant, and treatment with oxygen in a white liquor oxidation plant. If sulfuric acid or sulfurous acids are used in a cellulose coagulation step such acids may be recovered from splitting sodium and sulfur (by gasification and/or by acidulation of raw green liquor) over oxidation of reduced sulfur compounds to sulfur oxides which, when dissolved in water, form acidic liquors suitable for use in a cellulose coagulation step.

Alkaline liquors produced in the recovery system of the present invention can be subjected to an oxidative treatment with an oxygen containing gas in order to eliminate any traces of sulfide before the liquor is recycled and charged to the desired cellulose dissolving/shaping, bleaching or oxygen delignification stage of the present invention.

vi) Sulfur Free Lignin Recovery

In one embodiment of the present invention the pulping process is substantially sulfur chemicals free. In this configuration a portion of the lignin can advantageously be extracted and separated from a spent liquor stream or digester circulation stream prior to final concentration and discharge to a recovery boiler or gasifier. A substantially sulfur chemicals free lignin can be recovered in accordance with state of the art lignin recovery technologies. The sulfur free lignin can be used as a raw material or precursor for fine chemicals, carbon fibers, phenols, and engineering plastic products or be used as a sulfur free biofuel. Lignin can be precipitated from cellulose spent liquors with solids content in the range of 3-30% supported by the action of one or more acids including sulfur oxide acidic liquors and carbon dioxide. Sulfur oxide acidic liquors can be produced on site as described herein. Carbon dioxide can be recovered from gaseous streams in the dissolving pulp mill. The total sulfur content of washed lignin recovered by the procedure described herein (including covalently bonded sulfur) is lower than about 1% by weight of dry lignin, preferably lower than 0.5% sulfur and most preferred lower than about 0.1% sulfur by weight.

vii) Dissolving of Pulp in Alkaline or Acidic Solvents and Cellulose Shaping

A dissolving grade pulp imported to or produced in an chemical pulp mill is dissolved in a cellulose solvent forming a substantially homogeneous cellulose solution. The dissolved cellulose is shaped into new fibers, films or cellulose derivatives in one or more processing steps following the cellulose dissolving. Cellulose shaping into new fibers can be performed by injection of the cellulose solution through nozzles, directly or by air jet, into a coagulation bath comprising coagulation chemicals. The coagulation chemicals are characterized in that they are poor cellulose solvents. Cellulose fibers are reformed (and drawn) in the coagulation step into a filament or tow of regenerated cellulose. The filament or tow can advantageously be further converted to a cellulosic staple fiber for export from a cellulose dissolving plant. Cellulosic staple fibers can be used in wide range of end products such as textiles and hygienic consumer products. Cellulose shaping can also performed by injection of the cellulose solution onto a moving bed forming a nonwoven cellulose fiber network (spunlaid nonwoven). Coagulation liquid may be added to the moving bed, or thereafter, to strengthen the fiber network. Various forms of hydro entanglement may be applied to obtain the desired cellulosic network structure and strength. Cellulose shaping may also be performed by reacting the dissolved cellulose in homogeneous phase with a reactant forming cellulose derivatives such as, for example, cellulose esters.

We have discovered that there is a great technical, environmental and commercial advantage if the recovery of cellulose dissolving and/or coagulation chemicals can be recovered in conjunction with the recovery of cooking and oxygen delignification chemicals. Surprisingly, the chemicals used in dissolving or coagulation steps of the present invention may, provided the selected conditions and additives are used, be recovered in recovery systems used also for cooking and/or oxygen delignification.

In order to obtain a high cellulose concentration in the cellulose dope the dissolving pulp (obtained after cooking, bleaching and hemicelluloses extraction) can be activated prior to dissolving, primarily to increase accessibility for cellulose dissolving chemicals. Activation may also partially decrystallize the cellulose and shorten the cellulose molecules from a typical Dp (degree of polymerization of anhydroglucose repeating units) in the range of 700-1300 in the dissolving pulp to a range of 200-700. The dissolving pulp activation can be performed by either of, or a combination of, swelling in alkali hydroxide, enzymatic treatment, electron beam treatment, hydrothermal treatment and steam explosion treatment.

A hydrothermal treatment of the cellulose material may be performed in a closed vessel (batch digester) at a temperature of about 100 to 200° C. for 30 minutes to 5 hours with or without the presence of additives (such as weak organic acids). Microwaves can be used for supply of energy to the dissolving pulp activation stage.

Steam explosion activation may be performed continuously or in batch by treating cellulose pulp or pulp slurry with steam at a pressure in the range of 2 MPa to 6 MPa during 5 to 500 seconds. Optionally the pH in the pulp slurry may be adjusted to a pH below about 7 by the addition of alkali. The pulp is after steam treatment abruptly discharged into a vessel at considerably lower or atmospheric pressure. If a xylane rich pulp is treated by the steam explosion activation treatment disclosed herein, the xylane is to a considerably degree dissolved in the pulp slurry. Such xylane can be recovered and upgraded in accordance with procedures described herein.

Activated cellulose pulp is after any activation procedure described herein transferred to a cellulose dissolving step The most preferred cellulose dissolving chemical system is based on alkali hydroxide in the presence of an amphiphilic additive compound. Amphiphilic compounds are characterized in that they possess both a hydrophilic and a lipophilic moiety. The alkali hydroxide is preferably sodium hydroxide produced by causticising sodium carbonate rich liquor. Sodium hydroxide may be pretreated with oxygen or ozone in order to oxidize reduced sulfur. The concentration of alkali hydroxide in the cellulose dope is below 20% by weight, preferably adjusted to around 10% by weight.

The amphiphilic compound is a polyelectrolyte, surfactant (anionic, cationic, nonionic or zwitterionic), polyethyleneglycol, urea, thiourea, or guanidine. Specifically preferred amphiphilic compounds include SDS (sodiumdodecyl sulfate), polyethylene glycol/polypropylene glycol copolymers and lecithin. The additive is used in a concentration below about 10% by weight of the cellulose in the solution, preferably below about 3%.

The dissolving of cellulose is preferably performed in temperature range of minus 15° C. to plus 20° C.

Provided the cellulose spinning system can accommodate highly viscous dopes, the concentration of cellulose in the cellulose dope can be as high as 25% by weight. The cellulose polymers may be ordered in the dope in the form of a liquid crystalline phase, such phase having advantageous properties for cellulose shaping into new fibers with high tenacity.

The concentration of cellulose can also be kept lower (5-15% by weight) in order to have a low viscosity and suitable cellulose dope rheology for performing homogeneous reactions or spinning in conventional spinning machinery.

The spinning dope comprising cellulose can be injected into a coagulation liquid bath through fine nozzles to form a cellulose filament or tow; alternatively the spinning dope can be injected into a moving bed forming a nonwoven web. The coagulation liquid is any suitable liquid with a low or very low capacity to dissolve cellulose. Advantageously the coagulation liquid comprises an alcohol such as a monohydric alcohol (ethanol, methanol, propanol, iso-propanol, acetone or a polyhydric alcohol (glycerol). The coagulation liquid may also be composed of acids (organic acids such as acetic acid, formic acid and mineral acids such as sulfuric acid) or a phosphate and/or sulfate salt. Furthermore the coagulation liquid can be a diluted cellulose dissolving liquid. Various types of additives including zink compounds may be added to the coagulation liquid to promote formation of a cellulose fiber with the desired physical properties and geometrical shape. Spent coagulation liquids are at least partly recycled to and recovered in the same equipment used for recovery of chemicals for cooking, oxygen delignification or pulp bleaching.

Whether cellulosic films, nonwoven webs, hydroentanglement bonded material, filaments or tows are produced the cellulosic product is normally washed in one or several stages with washing liquids. The system for recycle and recovery of washing liquids is advantageously integrated in the pulp mill energy and chemicals recovery system.

In addition to the alkaline cellulose solvent system disclosed herein concentrated phosphoric acid, organosulphonic acids (methane sulfonic, ethane sulfonic or aryl sulfonic) and/or molten salt hydrates preferably comprising zink chloride and/or a lithium anion such as $LiClO_4 * 3H_2O$ can be used for cellulose dissolving and cellulose shaping. Coagulation liquid in this configuration can be water, acetone, alcohol, phosphate salts or alkali hydroxide. While energy integration with a pulp mill is straightforward with these dissolving chemicals, the regeneration of acids and molten salt hydrate chemicals from the coagulation liquids is considerably more complicated than the recovery of alkaline cellulose solvents. Fresh phosphoric acid for cellulose dissolving can be produced by treating phosphate salts recovered from a coagulation bath with sulphuric acid (eventually generated on site) forming sulphate and the desired phosphoric acid.

Sulfate salts in spent chemicals (by-product from producing phosphoric acid on site or present in spent cellulose coagulation liquid) can be charged directly or indirectly to a recovery boiler or gas generator for reduction to sulfides. Sulfides can then in turn be separated for example in the form of hydrogen sulfide gas which gas is oxidized to sulfur oxides. Sulfur oxides produced in this way can be dissolved in water forming sulphuric acid or an acidic sulphur oxide solution suitable for use in a cellulose coagulation step.

According to the present invention there is provided a process for the production of a shaped cellulose material from lignocellulose and the recovery of chemicals used in said process as set forth in independent claim 1.

Further features and specific embodiments of the invention are set forth in the dependent claims.

The invention claimed is:

1. A process for manufacturing shaped cellulose material from lignocellulose comprising the steps of:
   a) providing a feed of comminuted lignocellulosic material comprising cellulose, hemicelluloses and lignin;
   b) separating lignin from lignocellulosic feed material by cooking the material at a temperature from between about 110 to 200° C. for a time period of from about 1 hour to 6 hours in an aqueous solution comprising soluble alkali, alkali earth metal or phosphorous compounds, thereby forming a first stream of solid material enriched in cellulose and a second spent liquor stream rich in dissolved lignin;
   c) treating the first stream enriched in cellulose from step b) by at least one of oxygen delignification, bleaching, and alkali extraction, to form a cellulose pulp with a lignin content below about 2 wt %;
   d) treating the second spent liquor stream from step b) comprising dissolved lignin, alkali, alkali earth, phosphorous or sulfur compounds, in a separate chemical recovery system comprising one or more chemical recovery units selected from the group consisting of a spent liquor concentration unit, a gas generator unit, a recovery boiler unit, and a causticising unit, wherein one or more of fresh alkali, alkali earth metal, phosphorous and sulfur compounds are recovered and reformed;
   e) dissolving the cellulose pulp having a lignin content below about 2 wt % from step c) in a solution comprising one or more of alkali, alkali earth, phosphorous, sulfur and molten salt compounds, the solution optionally comprising one or more additives, thereby forming a substantially homogeneous solution comprising dissolved cellulose, thereafter shaping or coagulating the dissolved cellulose into fibers, films or cellulose derivatives, and optionally washing the shaped or coagulated cellulose;
   f) discharging spent chemicals from at least one of:
      f1) the cellulose dissolving step in e),
      f2) the cellulose shaping or cellulose coagulation step in e), and
      f3) the shaped or coagulated cellulose washing step in e);
   g) recycling the spent chemicals in one or more units of the chemical recovery system of step d); wherein the spent chemicals are recovered and reformed;
   h) using fresh cellulose dissolving and/or cellulose shaping chemicals recovered from the chemical recovery system in step g) in the respective cellulose dissolving and/or cellulose shaping steps in e).

2. The process according to claim 1, wherein the cellulose pulp is activated prior to step e) in order to increase accessibility of cellulose dissolving chemicals.

3. The process according claim 1, wherein the alkali earth metal compound is one or more selected from the group consisting of sodium and magnesium.

4. The process according to claim 1, wherein the hemicelluloses are separated from the feed lignocellulosic material prior to cooking in step b).

5. The process according to claim 1, wherein pentoses are separated from cellulose pulp after cooking in step b) but prior to dissolving the cellulose pulp in step e).

6. The process according to claim 5, wherein the pentoses comprise xylanes.

7. The process according to claim 6, wherein xylane is separated from cellulose pulp by cold or warm extraction with an aqueous extractant comprising sodium hydroxide followed by precipitation of xylane from the extractant by dilution of the extractant with water, an alcohol, or by acidulating the extractant with an acid.

8. The process according to claim 7, wherein the alcohol is a lower monohydric $C_1$-$C_4$ alcohol.

9. The process according to claim 7, wherein precipitated xylane is transformed into furfural using an acidic process comprising acidulation and distillation or catalytic distillation.

10. The process according to claim 1, further comprising a cellulose activation step comprising one or more selected from the group consisting of swelling cellulose in alkali hydroxide, electron beam treatment of cellulose, steam explosion treatment of cellulose, hydrothermal treatment of cellulose, and enzymatic treatment of cellulose.

11. The process according to claim 10, wherein the hydrothermal treatment of cellulose comprises treating the cellulose in an aqueous solution optionally containing additives, at a temperature of from 100 to 200° C. for a time period of from 0.5 to 5 hours.

12. The process according to claim 10, wherein activation of cellulose by steam explosion treatment is performed continuously or in a batch reactor comprising treating cellulose with steam at a pressure in the range of from 2 MPa to 6 MPa for a period of time of from 5 to 500 seconds, thereafter the cellulose is abruptly discharged into a vessel at about atmospheric pressure.

13. The process according to claim 1, wherein in step d) the chemical recovery units comprise a causticising unit, and wherein spent cellulose dissolving or cellulose shaping chemicals comprising alkali metal compounds in step f) are charged to the causticising unit wherein alkali carbonate is converted to alkali hydroxide.

14. The process according to claim 1, wherein in step d) the chemical recovery units comprise a recovery boiler unit or a gas generator unit, and wherein the spent cellulose dissolving or cellulose shaping chemicals comprising alkali or alkali earth metal compounds in step f) are recycled to the recovery boiler unit or the gas generator unit for recovery of fresh alkali or alkali earth metal compounds.

15. The process according to claim 1, wherein in step d) the chemical recovery units comprise a recovery boiler unit or a gas generator unit, and wherein the spent cellulose dissolving or cellulose shaping chemicals in step f) are recycled to the recovery boiler unit or the gas generator unit for recovery of sulfur compounds.

16. The process according to claim 1, wherein spent cellulose shaping chemicals in step f) are discharged from the cellulose coagulation step according to f2).

17. The process according to claim 1, wherein spent cellulose dissolving or cellulose shaping chemicals comprise one or more of alkali hydroxide, alkali carbonate, alkali sulfate, alkali sulfite, zinc compounds, and phosphates.

18. The process according to claim 1, wherein spent cellulose dissolving or cellulose shaping chemicals in step f) are recovered from a shaped cellulose washing step according to f3).

19. The process according to claim 1, wherein one or more additives are present to support dissolving or shaping of cellulose in step e).

20. The process according to claim 19, wherein the one or more additives is an amphiphilic compound.

21. The process according to claim 20, wherein the amphiphilic compound is selected from the group consisting of an ionic surfactant, a non-ionic surfactant, a polyethylene glycol compound, urea, thiourea, lecithin, betaine, and guanidine.

22. The process according to claim 1, wherein the sulfur compound of step e) is one or more of concentrated sulfuric acid, methane sulfonic acid, ethane sulfonic acid, and aryl sulfonic acid, and the phosphorous compound of step e) is concentrated phosphoric acid.

23. The process according to claim 1, wherein the molten salt of step e) consists of one or more of zinc chloride and lithium salts.

24. The process according to claim 1, wherein sulfuric acid is produced from reduced sulfur compounds originating in the recovery boiler unit or the gas generator unit wherein at least a portion of the sulfuric acid is used in the cellulose dissolving or cellulose shaping step or for manufacturing of phosphoric acid.

25. The process according to claim 24, wherein the reduced sulfur compounds substantially in the form of hydrogen sulfide are liberated from green liquor formed by dissolving a smelt from the recovery boiler unit or separated from the gas generator unit gas wherein the hydrogen sulfide is oxidized to sulfur oxides and dissolved in water to form an acidic solution.

26. The process according to claim 25, wherein an acidic solution is used in the cellulose shaping or coagulation step of f2) and/or for precipitating lignin from a spent cooking liquor.

27. The process according to claim 1, wherein substantially no sulfur compounds are present during cooking in the cooking step b).

28. The process according to claim 1, wherein substantially sulfur free lignin is recovered from the spent liquor stream prior to charging the spent liquor to the recovery boiler unit or the gas generator unit.

29. The process according to claim 1, wherein the cellulose pulp of step c) has a lignin content below about 1%.

30. A process for manufacturing shaped cellulose material from cellulose pulp and the recovery and recycling of spent cellulose dissolving and cellulose shaping chemicals, comprising the steps of:
 a) providing a feed of cellulose pulp having a lignin content below about 2 wt %;
 b) dissolving the cellulose pulp from a) in a solution comprising one or more of alkali metal, alkali earth metal, phosphorous, sulfur and molten salt compounds, the solution optionally comprising one or more additives, thereby forming a substantially homogeneous solution comprising dissolved cellulose; wherein spent cellulose dissolving chemicals are optionally discharged;
 c) shaping the dissolved cellulose from step b) into fibers, films or cellulose derivatives; wherein spent cellulose shaping chemicals are discharged; and
 d) recycling the spent chemicals discharged in step c) and optionally also in step b) in a separate chemical recovery system comprising one or more chemical recovery units selected from the group consisting of a liquor concentration unit, a recovery boiler unit, a gas generator unit, and a causticising unit, wherein the chemical recovery units are integrated in a kraft, sulfite, or soda pulp mill.

31. The process according to claim 30, wherein the cellulose pulp is activated prior to step b) in order to increase accessibility of cellulose dissolving chemicals.

32. The process according to claim 30, wherein pentoses are separated from cellulose pulp after step a) but prior to a cellulose dissolving step.

* * * * *